US008727374B1

(12) United States Patent
Line et al.

(10) Patent No.: US 8,727,374 B1
(45) Date of Patent: May 20, 2014

(54) VEHICLE SEATBACK WITH SIDE AIRBAG DEPLOYMENT

(71) Applicant: Ford Global Technologies, LLC, Dearborn, MI (US)

(72) Inventors: Johnathan Andrew Line, Northville, MI (US); Daniel Ferretti, Commerce Township, MI (US); John W. Jaranson, Dearborn, MI (US); Grant A. Compton, Livonia, MI (US); Kendrick Alden Harper, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/749,589

(22) Filed: Jan. 24, 2013

(51) Int. Cl.
*B60R 21/207* (2006.01)
(52) U.S. Cl.
USPC .................................. 280/728.3; 280/730.2
(58) Field of Classification Search
USPC .............. 280/728.3, 728.1, 730.1, 730.2
See application file for complete search history.

(56) References Cited

U.S. PATENT DOCUMENTS

| | | | |
|---|---|---|---|
| 2,958,369 | A | 11/1960 | Pitts et al. |
| 3,403,938 | A | 10/1968 | Cramer et al. |
| 3,663,057 | A * | 5/1972 | Lohr et al. ............... 297/452.14 |
| 3,929,374 | A | 12/1975 | Hogan et al. |
| 4,324,431 | A | 4/1982 | Murphy et al. |
| 4,334,709 | A | 6/1982 | Akiyama et al. |
| 4,353,595 | A | 10/1982 | Kaneko et al. |
| 4,541,669 | A | 9/1985 | Goldner |
| 4,629,248 | A | 12/1986 | Mawbey |
| 4,720,141 | A | 1/1988 | Sakamoto et al. |
| 4,915,447 | A | 4/1990 | Shovar |
| 5,171,062 | A | 12/1992 | Courtois |
| 5,174,526 | A | 12/1992 | Kanigowski |
| 5,518,294 | A | 5/1996 | Ligon, Sr. et al. |
| 5,560,681 | A | 10/1996 | Dixon et al. |
| 5,647,635 | A | 7/1997 | Aumond et al. |
| 5,755,493 | A | 5/1998 | Kodaverdian |

(Continued)

FOREIGN PATENT DOCUMENTS

| | | |
|---|---|---|
| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Nicole Verley
(74) *Attorney, Agent, or Firm* — Vichit Chea; Price Heneveld LLP (57) ABSTRACT

A vehicle seatback assembly includes a seatback side support that has a frame member that extends. A suspension component extends forward from the side support to define a peripheral gap. An airbag module is operably coupled to the frame member. A first trim piece conceals a rear area of the frame member and extends forward over the airbag module. A second trim piece is coupled to a forward portion of the frame member and is detachably coupled with the first trim piece along a seam. The airbag module is deployable forward through the seam to move the second trim piece into the peripheral gap.

20 Claims, 5 Drawing Sheets

(56) References Cited

U.S. PATENT DOCUMENTS

| | | | |
|---|---|---|---|
| 5,769,489 A | 6/1998 | Dellanno | |
| 5,799,971 A * | 9/1998 | Asada | 280/730.2 |
| 5,803,490 A * | 9/1998 | Seventko et al. | 280/730.2 |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,944,341 A * | 8/1999 | Kimura et al. | 280/728.3 |
| 5,951,039 A | 9/1999 | Severinski et al. | |
| 5,988,674 A * | 11/1999 | Kimura et al. | 280/730.2 |
| 6,019,387 A * | 2/2000 | Jost | 280/730.2 |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A * | 12/2000 | Kimura et al. | 280/728.2 |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,234,518 B1 * | 5/2001 | Ryl et al. | 280/730.2 |
| 6,296,308 B1 | 10/2001 | Cosentino et al. | |
| 6,302,431 B1 * | 10/2001 | Sasaki et al. | 280/728.2 |
| 6,312,050 B1 | 11/2001 | Eklind | |
| 6,352,304 B1 * | 3/2002 | Sorgenfrei | 297/216.13 |
| 6,357,789 B1 * | 3/2002 | Harada et al. | 280/730.2 |
| 6,364,414 B1 | 4/2002 | Specht | |
| 6,375,269 B1 | 4/2002 | Maeda et al. | |
| 6,386,577 B1 * | 5/2002 | Kan et al. | 280/730.2 |
| 6,394,546 B1 | 5/2002 | Knoblock et al. | |
| 6,439,597 B1 * | 8/2002 | Harada et al. | 280/728.2 |
| 6,454,353 B1 | 9/2002 | Knaus | |
| 6,457,741 B2 * | 10/2002 | Seki et al. | 280/730.2 |
| 6,523,892 B1 | 2/2003 | Kage et al. | |
| 6,550,856 B1 | 4/2003 | Ganser et al. | |
| 6,554,365 B2 * | 4/2003 | Karschin et al. | 297/440.14 |
| 6,561,540 B1 * | 5/2003 | Hasegawa et al. | 280/730.2 |
| 6,565,150 B2 | 5/2003 | Fischer et al. | |
| 6,578,911 B2 * | 6/2003 | Harada et al. | 297/216.13 |
| 6,588,838 B1 * | 7/2003 | Dick et al. | 297/216.13 |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,025,423 B2 * | 4/2006 | Fujita et al. | 297/452.38 |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,134,686 B2 * | 11/2006 | Tracht et al. | 280/730.2 |
| 7,159,934 B2 | 1/2007 | Farquhar et al. | |
| 7,185,950 B2 | 3/2007 | Pettersson et al. | |
| 7,195,274 B2 * | 3/2007 | Tracht | 280/728.3 |
| 7,195,277 B2 * | 3/2007 | Tracht et al. | 280/730.2 |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,284,768 B2 * | 10/2007 | Tracht | 280/730.2 |
| 7,344,189 B2 | 3/2008 | Reed et al. | |
| 7,350,803 B2 * | 4/2008 | Abramczyk et al. | 280/730.2 |
| 7,350,859 B2 | 4/2008 | Klukowski | |
| 7,357,412 B2 * | 4/2008 | Tracht et al. | 280/730.2 |
| 7,393,005 B2 | 7/2008 | Inazu et al. | |
| 7,401,852 B2 * | 7/2008 | Humer et al. | 297/216.13 |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,540,529 B2 * | 6/2009 | Tracht et al. | 280/730.2 |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,888 B2 * | 3/2010 | Sato et al. | 280/730.2 |
| 7,669,928 B2 | 3/2010 | Snyder | |
| 7,677,594 B2 * | 3/2010 | Hazlewood et al. | 280/728.2 |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,866,689 B2 * | 1/2011 | Saberan | 280/730.2 |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,926,872 B2 * | 4/2011 | Chida et al. | 297/216.14 |
| 7,931,294 B2 | 4/2011 | Okada et al. | |
| 7,931,330 B2 | 4/2011 | Itou et al. | |
| 7,938,440 B2 * | 5/2011 | Kataoka et al. | 280/730.2 |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,113,539 B2 * | 2/2012 | Paruszkiewicz et al. | 280/728.3 |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,392 B2 * | 4/2012 | Humer et al. | 297/216.12 |
| 8,162,397 B2 | 4/2012 | Booth et al. | |
| 8,167,370 B2 | 5/2012 | Arakawa et al. | |
| 8,177,256 B2 * | 5/2012 | Smith et al. | 280/730.2 |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,113 B2 * | 7/2012 | Yamashita | 280/730.2 |
| 8,226,165 B2 | 7/2012 | Mizoi | |
| 8,251,396 B2 * | 8/2012 | Zothke et al. | 280/728.2 |
| 8,328,231 B2 * | 12/2012 | Nakamura et al. | 280/730.2 |
| 8,474,917 B2 * | 7/2013 | Line et al. | 297/452.38 |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2006/0113765 A1 * | 6/2006 | Tracht | 280/730.2 |
| 2007/0120401 A1 | 5/2007 | Minuth et al. | |
| 2008/0174159 A1 | 7/2008 | Kojima et al. | |
| 2009/0066122 A1 | 3/2009 | Minuth et al. | |
| 2009/0102255 A1 * | 4/2009 | D'Agostini et al. | 297/216.12 |
| 2009/0322124 A1 | 12/2009 | Barkow et al. | |
| 2010/0007122 A1 * | 1/2010 | Clauser et al. | 280/730.2 |

(56) References Cited

U.S. PATENT DOCUMENTS

| | | |
|---|---|---|
| 2010/0038937 A1 | 2/2010 | Andersson et al. |
| 2010/0133794 A1* | 6/2010 | Tracht et al. .............. 280/730.2 |
| 2010/0140986 A1 | 6/2010 | Sawada |
| 2010/0148546 A1* | 6/2010 | Demontis et al. ........ 297/216.13 |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2011/0309604 A1* | 12/2011 | Moore et al. .............. 280/730.2 |
| 2012/0043791 A1* | 2/2012 | Kojima .................... 297/216.13 |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0119646 A1* | 5/2013 | Tracht ........................ 280/730.1 |
| 2013/0119723 A1* | 5/2013 | Nitsuma .................. 297/216.13 |
| 2013/0134749 A1* | 5/2013 | Awata et al. ............. 297/216.13 |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| WO | WO9511818 | 5/1995 |
| WO | WO9958022 | 11/1999 |
| WO | WO2006131189 | 12/2006 |
| WO | WO2007028015 | 8/2007 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

\* cited by examiner

VEHICLE SEATBACK WITH SIDE AIRBAG DEPLOYMENT

FIELD OF THE INVENTION

The present invention generally relates to a seatback for a vehicle seating assembly, and more particularly to a vehicle seatback with side airbag deployment.

BACKGROUND OF THE INVENTION

It is becoming increasingly more common for vehicles to include side airbags that deploy between a vehicle seat and a vehicle door. In some instances, a side airbag is included within a vehicle seatback to deploy forward and provide a cushioned barrier between a seated passenger and an adjacent vehicle door. Frequently, these side airbags are encased within the fabric upholstery material of the seatback, such that upon deployment of the airbag the upholstery material is torn to allow the airbag to fully inflate. This form of deployment may result in inconsistent airbag deployment direction and substantial damage to the vehicle seatback.

SUMMARY OF THE INVENTION

According to one aspect of the present invention, a vehicle seatback assembly includes a seatback side support that has a frame member extending therein. A suspension component extends forward from the side support to define a peripheral gap. An airbag module is operably coupled to the frame member. A first trim piece conceals a rear area of the frame member and extends forward over the airbag module. A second trim piece is coupled to a forward portion of the frame member and is detachably coupled with the first trim piece along a seam. The airbag module is deployable forward through the seam to move the second trim piece into the peripheral gap.

According to another aspect of the present invention, a vehicle seatback assembly includes inboard and outboard side supports that define a seatback structure. A deployable airbag module is coupled with the outboard side support. A rear panel is at least partially wrapped around the side supports to cover the airbag module. A front valance is coupled with the outboard side support and abuts the rear panel at a detachable seam that opens outwardly when the airbag module deploys.

According to yet another aspect of the present invention, a vehicle seatback assembly includes a side support that has a frame member. An airbag is coupled to an elongated channel of the frame member and is operable between contained and deployed positions. A rear trim piece extends forward adjacent the airbag. A front trim piece is coupled to the frame member and abuts the rear trim piece to conceal the airbag in the contained position. The front trim piece flexes forward from the rear trim piece in the deployed position.

These and other aspects, objects, and features of the present invention will be understood and appreciated by those skilled in the art upon studying the following specification, claims, and appended drawings.

DETAILED DESCRIPTION OF THE EMBODIMENTS

Figures 1, 2:
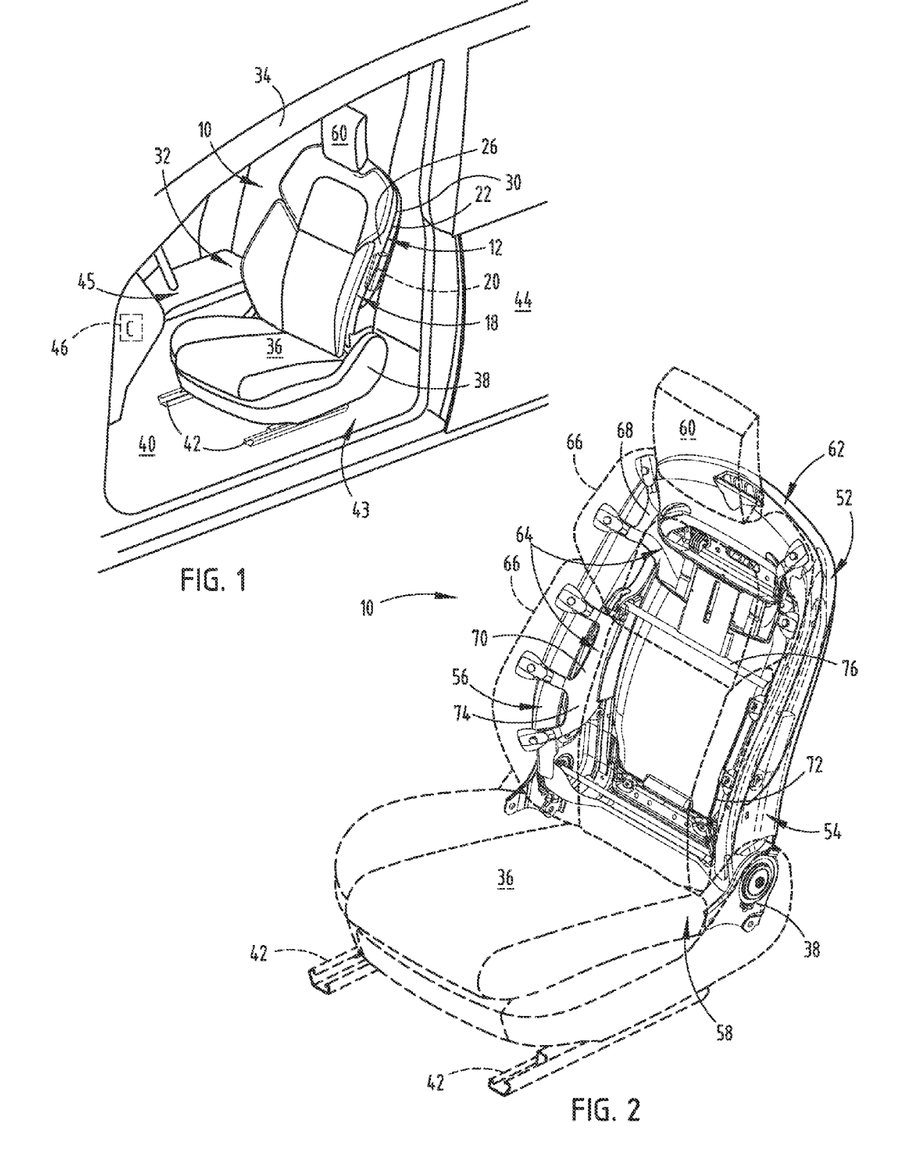
FIG. 1 is a top perspective view of a seating assembly in a vehicle.
FIG. 2 is a top perspective view of the seating assembly showing a support structure of a vehicle seatback assembly and a suspension assembly extending from the support structure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-7A, reference numeral 10 generally designates a vehicle seatback assembly that includes a seatback side support 12 that has a frame member 14 that extends within the side support 12. A suspension component 16 extends forward from the side support 12 to define a peripheral gap 18. An airbag module 20 is operably coupled to the frame member 14. A first trim piece 22 conceals a rear area 24 of the frame member 14 and extends forward over the airbag module 20. A second trim piece 26 is coupled to a forward portion 28 of the frame member 14 and is detachably coupled with the first trim piece 22 along a seam 30. The airbag module 20 is deployable forward through the seam 30 to move the second trim piece 26 into the peripheral gap 18.

Referring now to FIG. 1, a seating assembly 32 is positioned in a driver side location of a vehicle 34. The seating assembly 32 includes a seat 36 that is pivotally coupled with the vehicle seatback assembly 10 about a recliner bracket 38 for pivotally adjusting the vehicle seatback assembly 10 between upright and reclined positions relative to the seat 36. The seat 36 is slidably coupled with a floor 40 of the vehicle 34 upon a track assembly 42. The track assembly 42 is configured to allow the seating assembly 32 to adjust in a forward and rearward direction relative to the floor 40 of the vehicle 34. It is understood that the seating assembly 32 may be positioned in various positions throughout the vehicle 34 other than the illustrated location, such as a passenger side location, a mid-row location, and a rear seat location. It is also conceivable that the seat 36 may not include the reclining feature and may not include the track assembly 42 such that the seat 36 may be fixedly or alternatively coupled with the floor 40 of the vehicle 34.

As also shown in FIG. 1, a controller 46 on the vehicle 34 is electrically coupled with the airbag module 20. The vehicle controller 46 actuates an airbag 48 (FIG. 7) in the airbag module 20 to inflate to a deployed position 50 (FIG. 7A) when the vehicle controller 46 senses a collision event of the vehicle 34, as generally understood in the art. The airbag module 20 is included on the outboard side support 12 of the seatback assembly 10. The outboard connotation, for purposes of this disclosure, refers to a lateral side of the vehicle 34 most proximate a side door 44 or a side interior region 43 of the vehicle 34. In turn, the inboard connotation for purposes of this disclosure refers to an area most proximate in a central interior region 45 of the vehicle 34 between the laterally opposing outboard sides.

With reference to FIG. 2, the seatback assembly 10 includes a seatback structure 52 having a first side support 54 and a second side support 56, each pivotally coupling with a rear portion 58 of the seat 36. A headrest 60 is coupled with and supported by a top support 62 of the seatback structure 52 and positioned centrally between the first and second side supports 54, 56. A seatback suspension system 64 extends forward from the seatback structure 52 to engage a passenger support 66. The suspension system 64 includes an upper suspension component 68 and a lower suspension component 70. The lower suspension component 70 statically couples with the lower portion of the seatback structure 52. The lower suspension component 70 includes a first side segment 72 and a second side segment 74 that each independently couple with the seatback structure 52 and extend forward and outward therefrom. The upper suspension component 68 is positioned above the lower suspension component 70 and couples to a pivot bar 76 that extends between the first and second side supports 54, 56 proximate the upper portion of the lower suspension component 70. It is contemplated that the headrest 60 may be integrated with the top support 62 of the seatback structure 52 or that the headrest 60 may otherwise not be included on the seating assembly 10. It is also conceivable that the headrest 60 may be integrated with the passenger support 66 and/or the upper suspension component 68.

Figures 3, 4:
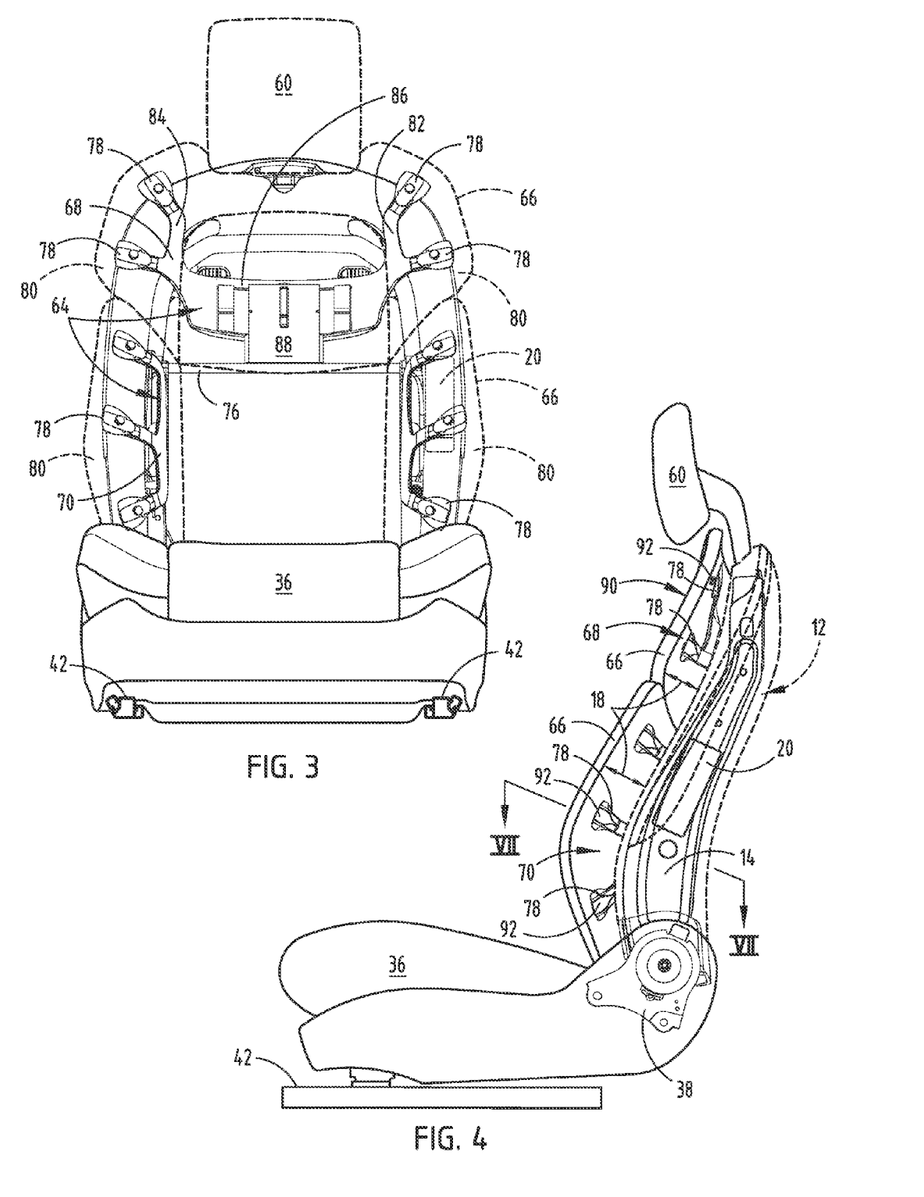
FIG. 3 is a front elevational view of the seating assembly, having a passenger support and a headrest shown in dashed lines.
FIG. 4 in a side elevational view of the seating assembly, showing an internal frame of the support structure.

As illustrated in FIG. 3, the upper and lower suspension components 68, 70 include outwardly extending flexible members 78 that extend forward and laterally outward from the seatback structure 52 to operably couple with angled side bolsters 80 of the passenger support 66. The angled side bolsters 80 are integrated with the shape of the passenger support 66 and are configured to prevent lateral movement of a passenger's back relative to the passenger support 66, such as lateral movement of a passenger caused by turning the vehicle in motion. The upper suspension component 68 has a first arm 82, a second arm 84, and a central body 86 there between. The first and second arms 82, 84 of the upper suspension component 68 each include two outwardly extending flexible members 78. The central body 86 of the upper suspension component 68 operably couples with an extension bracket 88 that protrudes upward from the pivot bar 76. The pivot bar 76 laterally extends between the first and second side supports 54, 56 rearward the passenger support 66, such that the upper suspension component 68 is configured to pivot forward about the pivot bar 76 to define a dynamically adjustable upper back support surface 90 (FIG. 4). It is contemplated that the pivot bar 76 is operably coupled with a motorized actuation assembly that is configured to pivot the upper suspension component 68 forward and rearward upon actuation of the motorized actuation assembly. However, it is also contemplated that the pivot bar 76 may be operably coupled with a manually adjustable actuation mechanism or statically coupled between the first and second side support 54, 56.

As shown in FIG. 4, the passenger support is operably coupled with a distal end 92 of the suspension components 68, 70 and, more specifically, a connection feature 94 on the distal ends 92 of the flexible members 78 couples with engagement apparatus 96 on a trim carrier 98 of the passenger support 66. The suspension system 64 suspends the passenger support 66 away from the seatback structure 54 to define the external peripheral gap 18 between the first and second side supports 54, 56 and the passenger support 66. The external peripheral gap 18 may be compressed proximate a rearward force acting on the passenger support 66 that elastically deforms one or more of the flexible members 78 supporting the passenger support 66. As such, the upper suspension component 68 and the lower suspension component 70, including the flexible members 78 thereof, are independently flexible under the weight of an occupant. It is conceivable that more or fewer flexible members 78 may be included on the upper and/or lower suspension components 68, 70, such as a single fin-shaped flexible member on either side of the upper and lower suspension components 68, 70. Further, it is contemplated that the passenger support 66 may include alternative shapes or orientations to operable couple with the suspension system 64.

Figure 5:
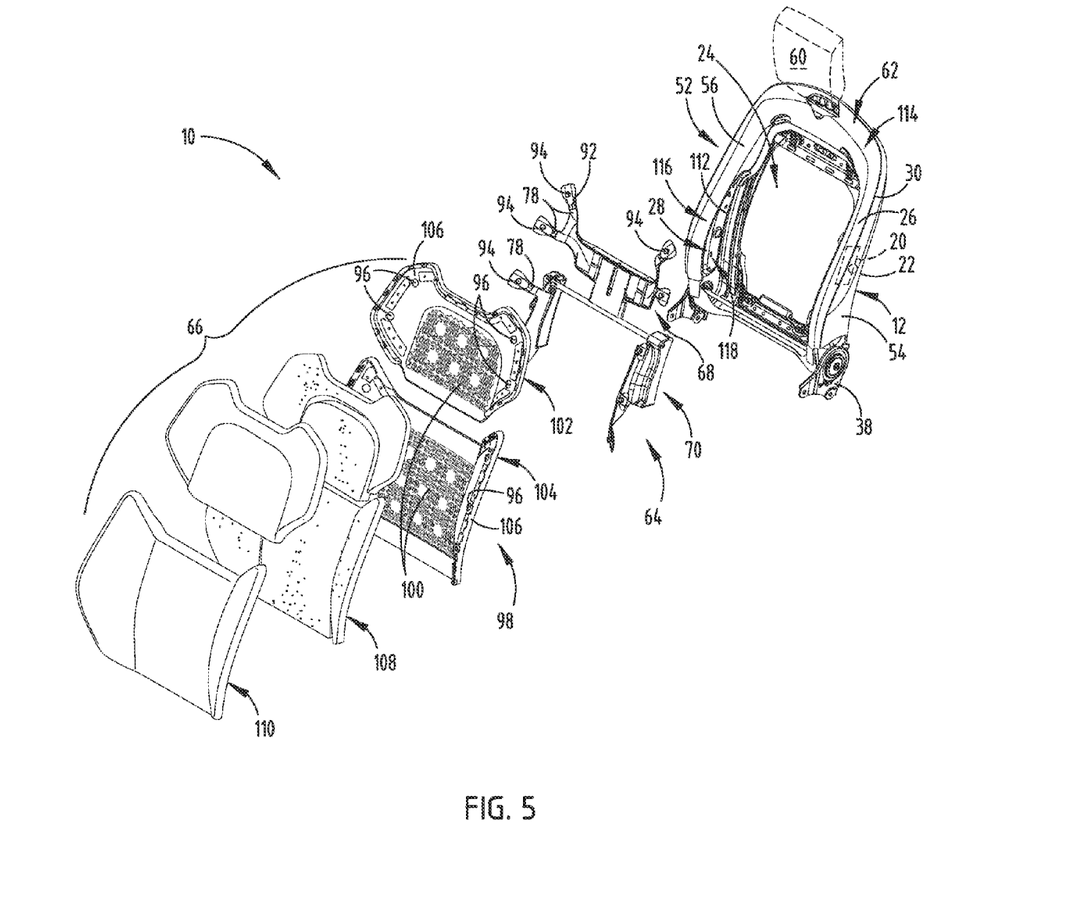
FIG. 5 is an exploded top perspective view of the vehicle seatback assembly.

Referring now to FIG. 5, the passenger support 66 detachably couples with the connection features 94 on the distal ends 92 of the flexible members 78. The passenger support 66 includes the trim carrier 98 having an open matrix 100 that defines a pattern of resilient elements that are configured to support the weight of a passenger. The trim carrier 98 has an upper panel 102 and a lower panel 104 that respectively couple with the upper suspension component 68 and the lower suspension component 70 in a friction-fit connection. The friction-fit connection is formed between the connection feature 94 on the flexible members 78 and the engagement aperture 96 on an edge portion 106 of the trim carrier 98. The passenger support also includes a cushion 108 that is disposed over a forward facing surface of the trim carrier 98. The cushion 108 includes a resilient structure of woven fibers to have open areas that allow ventilation; however, the cushion 108 may also conceivably include an open cell foam, a closed cell foam, or other conceivable flexible and breathable materials. The passenger support 66 further includes a cover stock 110 to define the back support surface 90 of the passenger support 66 and to assist in retaining the cushion 108 against the trim carrier 98. The cover stock 110 may conceivably include a fabric material, a leather material, a vinyl material, or other conceivable upholstery materials.

As also shown in FIG. 5, the seatback structure 52 includes an internal frame 112 and a trim shroud 114 configured to substantially enclose the internal frame 112. The trim shroud 114 includes the first trim piece 22 and the second trim piece 26 that detachably engage along the seam 30 therebetween to conceal the airbag module 20 and to define an exterior surface of the side supports 54, 56. The first trim piece 22 substantially encloses a rear area 24 of the seatback structure 52. The second trim piece 26 substantially encloses a front edge 116 of the seatback structure 52, which includes the forward portion 28 of the internal frame 112. The upper and lower components 68, 70 of the suspension system 64 couple with an interior portion 118 of the internal frame 112 and extend forward beyond the first trim piece 22 to detachably couple the passenger support 66. It is also contemplated that the second trim piece 26 may extend laterally inward to at least partially be integrated with the suspension system 64 and substantially enclose the front edge 116 of the seatback structure 52.

Figure 6:
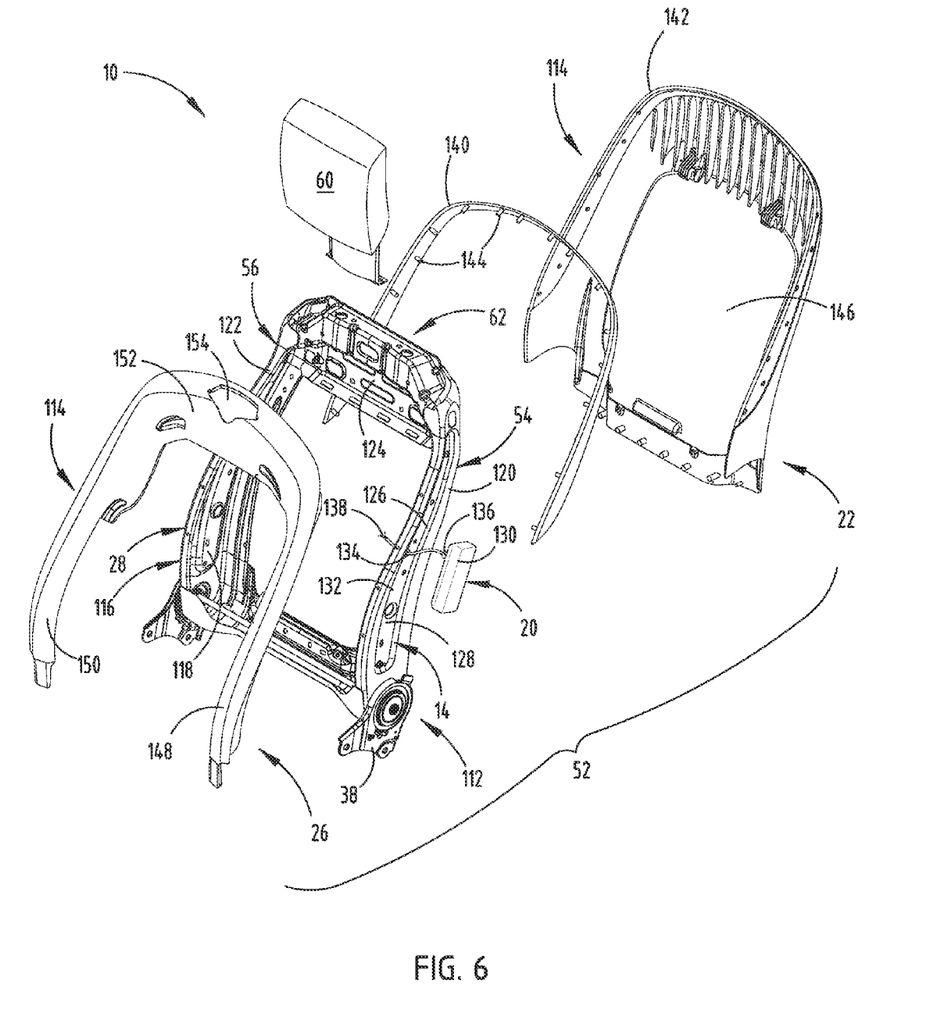
FIG. 6 is an exploded top perspective view of the vehicle seatback assembly, having the support structure further exploded.

As illustrated in FIG. 6, the internal frame 112 includes a first frame member 120 and a second frame member 122 extending upward from the pivotal connection with the recliner brackets 38 that couple with the seat 38 (FIG. 4). The first and second frame members 120, 122 are substantially parallel with each other and curve upward and rearward from the recliner brackets 38 to provide a curved shape that is substantially similar to an occupant's spinal column. Further, the frame members 120, 122 are more robust proximate the recliner brackets 38 and taper as they extend upward to couple with a top frame member 124 that extends orthogonally between the first and second frame members 120, 122. Accordingly, the first and second seatback side supports 54, 56 include the first and second frame members 120, 122, respectively, and the top support 62 of the seatback structure 52 includes the top frame member 124 of the internal frame 112. The first frame member 120, corresponding with the outboard side of the seating assembly 32, includes an elongated cavity 126 on an exterior side 128 of the first frame member 120. The cavity 126 is shaped to receive a base portion 130 of the airbag module 20. More specifically, an intermediate region 132 of the longitudinal extent of the first frame member 120 includes a portion of the cavity that is shaped to retain the airbag module 20 and includes a retention aperture 134 for receiving a lateral protrusion 136 on the base portion 130 of the airbag module 20. The lateral protrusion 136 houses an electrical wire 138 that extends from the airbag module 20 to electrically couple the airbag module 20 with the vehicle controller 46 (FIG. 1).

The trim shroud 114 as shown in FIG. 6, has a reinforcement band 140 that detachably couples with an edge portion 142 of the first trim piece 22 to provide inward retention elements 144 for engaging the first trim piece 22 with the seatback structure 52. The first trim piece 22, shaped as a rear trim panel, partially wraps around the first and second frame members 120, 122 to at least partially cover the airbag module 20. In addition, the first trim piece 22 includes a substantially planar portion 146 that extends between the first and second frame members 120, 122. The edge portion 142 of the first trim piece 22 curves forward from the planar portion 146 to a location adjacent the airbag module 20. The second trim piece 26, shaped as a U-shaped front valance, includes a first side extension 148 and a second side extension 150 that engage the interior portion 118 of the first and second frame members 120, 122, respectively, and extend outward over the front edge 116 to engage the first trim piece 22. The second trim piece 26 also includes an upper portion 152 that couples with the top frame member 124 and includes a cutaway 154 for the headrest 60 to extend through and engage with the top frame member 124. It is contemplated that the internal frame 112 is constructed of a metal material and that the trim shroud 114 is molded of a polymer material; however, it is conceivable that the frame member may be constructed of other similar substantially rigid materials and the trim shroud may be made of other somewhat flexible materials relative to the internal frame.

Figure 7:
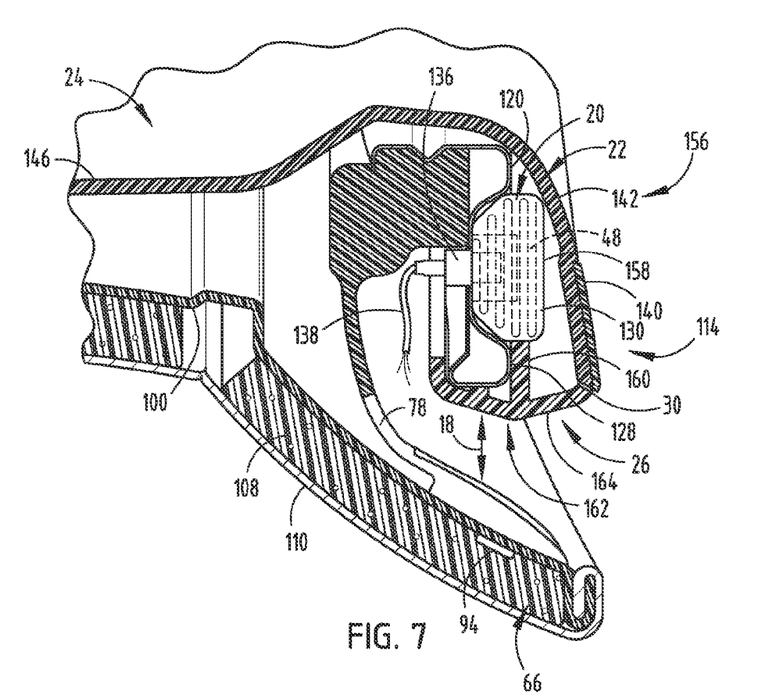
FIG. 7 is a cross-sectional view of an edge portion of the vehicle seatback assembly taken along line VII-VII of FIG. 4, having an airbag module shown in a contained position.

Referring now to FIG. 7, the airbag module 20 is shown in a contained position 156, where the airbag module 20 is substantially concealed by the trim shroud 114. In this position, the first trim piece 22 is in abutting contact with the second trim piece 26 along the seam 30. The edge portion 142 of the first trim piece 112 curves forward from the rear area 24 of the outboard frame member 120 adjacent an exterior surface 158 of the base portion 130 of the airbag module 20. The second trim piece 26 curves laterally outward and partially around the front edge 116 of the frame member 120 to detachably engage the edge portion 142 of the first trim piece 22. A support flange 160 extends rearward from an intermediate region 162 of the second trim piece 26. The support flange 160 is in abutting contact with the exterior side 128 of the frame member 120 and contacts the base portion 130 of the airbag module 20. A forward facing surface 164 of the second trim piece 26 is spaced from the passenger support 66 and the suspension component 16, which is shown as the lower suspension component 70. As such, the front valance may flex forward into the peripheral gap 18. It is contemplated that the specific shape and orientation of the first trim piece 22 and the second trim piece 26, especially with regard to components inboard the airbag module 20, may be alternatively shaped and constructed.

Figure 7A:
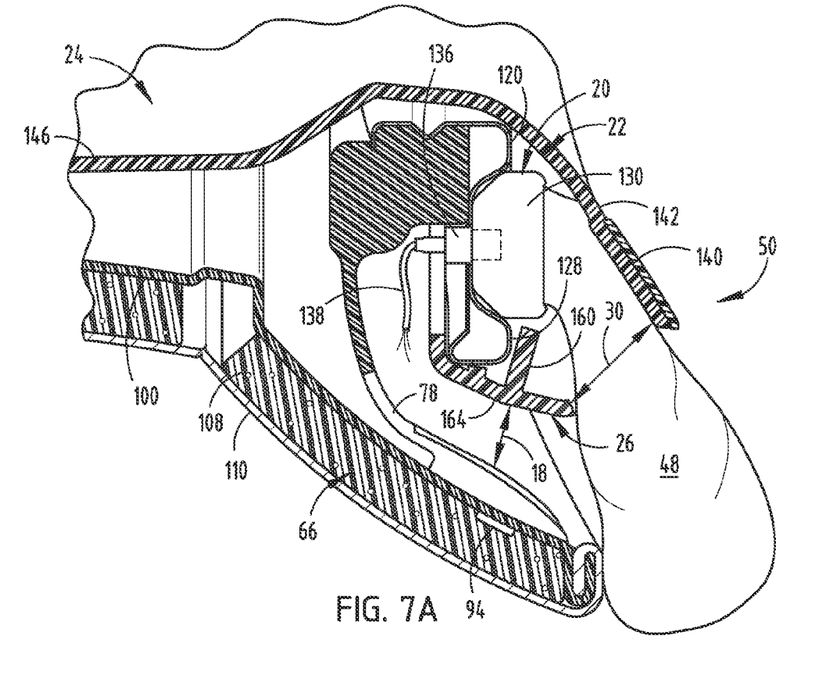
FIG. 7A is a cross-sectional view of the edge portion of the vehicle seatback assembly, having the airbag module shown in a deployed position.

As illustrated in FIG. 7A, the airbag module 20 is deployed forward through the seam 30 to move the second trim piece 26 into the peripheral gap 18. More specifically, the airbag 48 stowed within the base portion 130 of the airbag module 20 deploys from the contained position 156 (FIG. 7) to the deployed position 50, as shown. In the deployed position 50, the airbag 48 inflates and extends from the base portion 130 outward and forward through the seam 30 and beyond the passenger support 66. In this position, the airbag 48 provides a cushioned support between a seated passenger and an outboard interior surface of the vehicle 34, such as the side door 44 (FIG. 1). Upon inflation of the airbag 48, the airbag 48 deforms the edge portion 142 of the first trim piece 22 laterally outward. Also, the airbag 48 deforms the second trim piece 26 forward, such that the seam 30 widens at a consistent rate and orientation to accurately direct the airbag 48 forward beyond the passenger support 66 with minimal resistance from the passenger support 66. When the seam 30 opens outwardly and the second trim piece 26 deforms forward, the support flange 160 of the second trim piece 26 raises out of abutting contact with the exterior side surface 128 of the frame member 120. Also, the reinforcement band 140 on the edge portion 142 of the first trim piece 22 similarly flexes laterally outward with the second trim piece 26 on deployment of the airbag module 20.

The deployed position 50, as shown in FIG. 7A, is merely one depiction of an incremental stage as the airbag 48, upon deployment, inflates at a rapid rate pushing the airbag 48 out from the base portion of the airbag module 20 in the outward and forward direction beyond the illustrated position. It is contemplated that the airbag 20 may inflate with gases generated from a pyrotechnic reaction, a compressed air release, and/or another chemical reaction or other conceivable inflation methods. It is also conceivable that after deployment of the airbag module 18, the airbag module 18 may be replaced and the seatback assembly 10 may be restored with minimal necessary repair to the passenger support 66 and the suspension system 64.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seatback assembly comprising:
   a seatback side support having a frame member extending therein;
   a suspension component extending forward from the side support to define a peripheral gap;
   an airbag module operably coupled to the frame member;
   a first trim piece concealing a rear area of the frame member and extending forward over the airbag module; and
   a second trim piece coupled to a forward portion of the frame member and detachably coupled with the first trim piece along a seam, wherein the airbag module is deployable forward through the seam to move the second trim piece into the peripheral gap.

2. The vehicle seatback assembly of claim 1, further comprising:
   a passenger support operably coupled with a distal end of the suspension component, wherein the passenger support is suspended away from the side support.

3. The vehicle seatback assembly of claim 2, further comprising:
   an airbag stored within a base portion of the airbag module and deployable from a contained position to a deployed position, wherein the airbag inflates in the deployed position to extend from the base portion forward through the seam and beyond the passenger support.

4. The vehicle seatback assembly of claim 1, wherein the suspension component includes an outwardly extending flexible member that is coupled with an interior portion of the frame member.

5. The vehicle seatback assembly of claim 1, wherein the first and second trim pieces engage to conceal the airbag module and define an exterior surface of the side support.

6. The vehicle seatback assembly of claim 1, further comprising:
   a cavity on the side portion of the frame member for receiving a base portion of the airbag module, wherein the frame member includes a metal material and the first and second trim pieces include a polymer material.

7. A vehicle seatback assembly comprising:
   inboard and outboard side supports defining a seatback structure;
   a passenger support suspended away from the seatback structure defining a gap;
   an airbag module coupled with the outboard side support;
   a rear panel at least partially covering the airbag module; and
   a front valance abutting the rear panel at a detachable seam that opens outwardly, flexing the front valance forward into the gap, when the airbag module deploys.

8. The vehicle seatback assembly of claim 7, wherein the rear panel and front valance engage to conceal the airbag module and define an exterior surface of the seatback structure.

9. The vehicle seatback assembly of claim 8, wherein the airbag module includes an airbag that expands from a contained position to an inflated position when the airbag module deploys, and wherein the airbag in the inflated position deforms the rear panel laterally outward and the front valance forward to extend through the seam.

10. The vehicle seatback assembly of claim 7, further comprising:
    a suspension component having flexible members extending outward and forward from the inboard and outboard side supports to operably engage the passenger support.

11. The vehicle seatback assembly of claim 7, wherein the passenger support includes a trim carrier having an open matrix defining a pattern of resilient elements configured to support the weight of a passenger.

12. The vehicle seatback assembly of claim 7, wherein the gap is defined between the passenger support and the side supports proximate the airbag module, and wherein the front valance is flexible and configured to deform forward into the gap when the airbag module deploys.

13. The vehicle seatback assembly of claim 7, further comprising:
    a top support spanning between the inboard and outboard side supports, wherein the front valance couples with the top support and includes an aperture for a headrest to extend through and engage the top support.

14. A vehicle seatback assembly comprising:
    a side support having a frame member;
    a passenger support suspended away from the frame member defining a gap;
    an airbag coupled to the frame member;
    a rear trim piece extending forward adjacent the airbag; and a front trim piece coupled to the frame member, abutting the rear trim piece to conceal the airbag, and flexing forward into the gap upon deployment of the airbag.

15. The vehicle seatback assembly of claim 14, wherein a seam is formed between the trim pieces with the airbag in a contained position, and wherein the airbag extends through the seam to deform the rear trim piece laterally outward when the airbag inflates to a deployed position.

16. The vehicle seatback assembly of claim 14, further comprising:

a support flange extending rearward from an intermediate portion of the front trim piece to abut a side portion of the frame member, wherein the support flange separates from the side portion when the airbag inflates to a deployed position and flexes the front trim piece forward into the gap.

17. The vehicle seatback assembly of claim 14, further comprising:

a reinforcement band coupled with an edge portion of the rear trim piece proximate the front trim piece.

18. The vehicle seatback assembly of claim 14, further comprising:

a flexible suspension component extending outward and forward from the frame member to operably engage the passenger support.

19. The vehicle seatback assembly of claim 14, wherein the gap is defined between the passenger support and the side support, and wherein the front trim piece is configured to deform forward into the gap when the airbag inflates to a deployed position.

20. The vehicle seatback assembly of claim 14, further comprising:

a vehicle controller electrically coupled with the airbag, wherein the vehicle controller actuates the airbag to deploy when the vehicle controller senses a collision event.

\* \* \* \* \*